(12) United States Patent
Suzawa et al.

(10) Patent No.: US 10,060,312 B2
(45) Date of Patent: *Aug. 28, 2018

(54) EXHAUST GAS FILTER

(71) Applicant: DENSO CORPORATION, Kariya, Aichi-pref. (JP)

(72) Inventors: Takumi Suzawa, Nishio (JP); Yuto Amano, Nishio (JP); Manabu Ohsuka, Nishio (JP); Mikio Ishihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 78 days.

This patent is subject to a terminal disclaimer.

(21) Appl. No.: 15/207,810

(22) Filed: Jul. 12, 2016

(65) Prior Publication Data
US 2017/0016366 A1   Jan. 19, 2017

(30) Foreign Application Priority Data
Jul. 13, 2015   (JP) .................................. 2015-139736

(51) Int. Cl.
| | | |
|---|---|---|
| *F01N 3/022* | (2006.01) | |
| *F01N 3/08* | (2006.01) | |
| *B01J 35/04* | (2006.01) | |
| *B01J 23/46* | (2006.01) | |

(52) U.S. Cl.
CPC ......... *F01N 3/0222* (2013.01); *F01N 3/0821* (2013.01); *B01J 23/464* (2013.01); *B01J 35/04* (2013.01); *F01N 2250/02* (2013.01); *F01N 2330/06* (2013.01); *F01N 2510/0682* (2013.01); *F01N 2570/10* (2013.01);
(Continued)

(58) Field of Classification Search
None
See application file for complete search history.

(56) References Cited

U.S. PATENT DOCUMENTS 8,591,820 B2 * 11/2013 Boger ................ B01D 46/2474
264/628
2004/0161373 A1    8/2004 Ichikawa et al.
(Continued)

FOREIGN PATENT DOCUMENTS

JP         2009-131759        6/2009
WO    WO 2012/046484        4/2012

*Primary Examiner* — Walter Dean Griffin
*Assistant Examiner* — Jelitza M Perez
(74) *Attorney, Agent, or Firm* — Nixon & Vanderhye P.C.

(57) ABSTRACT

An exhaust gas filter for purifying exhaust gases including particulate matter discharged from an internal combustion engine includes a honeycomb structure whose axial direction matches an exhaust gas flow, a plug portion which selectively plugs upstream end faces of the honeycomb structure which faces the exhaust gas flow, and catalyst carried on the honeycomb structure.

The honeycomb structure has a plurality of partition walls and cells surrounded by the partition walls, and pores formed inside partition walls between adjacent cells communicating with each other. The plurality of the cells have open cells which are penetrated in the axial direction and plugged cells having one upstream end which face the exhaust gas flow plugged by the plug portion. The honeycomb structure has a first region which does not carry the catalyst on the partition walls and a second region which carries the catalyst on the partition walls.

6 Claims, 7 Drawing Sheets

(52) U.S. Cl.
CPC ...... *F01N 2570/12* (2013.01); *F01N 2570/14* (2013.01); *Y02T 10/20* (2013.01)

(56) References Cited

U.S. PATENT DOCUMENTS

2009/0226348 A1    9/2009   Ichikawa et al.
2013/0189938 A1    7/2013   Nakatani et al.

\* cited by examiner

FIG.13 the description of which is
EXHAUST GAS FILTER

CROSS-REFERENCE TO RELATED APPLICATION

This application is based on and claims the benefit of priority from earlier Japanese Patent Application No. 2015-139736 filed on Jul. 13, 2015, the description of which is incorporated herein by reference

TECHNICAL FIELD

This disclosure relates to an exhaust gas filter to purify the exhaust gases discharged from an internal combustion engine.

BACKGROUND

An exhaust gas filter to trap hazardous particulate matter (i.e. PM) contained in the exhaust gases is disposed in an exhaust pipe of an internal combustion engine, such as a vehicle engine. The exhaust gas filter includes a plurality of cells which have partition walls.

The cells may be designed to have a first and a second group thereof in an axial direction, which are in alignment in a honeycomb structure. In general, the cells comprise first and second cells. Some of the first cells are formed in such a way that upstream end faces of the first group, which face an exhaust gas flow, are respectively plugged by plug portions. Some of the second cells are formed in such a way that downstream end faces of the second group are respectively plugged by the plug portions. The partition walls are composed of porous material, and the exhaust gas flows into openings of the first group which faces the exhaust gas flow. The PM contained in the exhaust gases is removed by passing the exhaust gases via a partition wall which is disposed between the first and the second group. After this, the exhaust gases flow from the first group of the first cell via the partition walls and are discharged from the second group of the second cell.

In the exhaust gas filter of the above-mentioned structure, pressure loss when passing the exhaust gases through the filter easily increases in relation with an accumulation of the PM on the exhaust gas filter. Engine oil and trace impurities (e.g., S and Ca, or the like) contained in fuels generate ash. The ash carried with the exhaust gases into the exhaust gas filter also increases the pressure loss in accordance with the accumulation of the ash on the exhaust gas filter. Therefore, as shown in WO 2012/046486, for example, the exhaust gas filter has been proposed to be formed in a single-side plugging type structure. The single-side plugging type structure is formed in such a way that any some the upstream end faces of the cells in a honeycomb structure are respectively plugged by plugs. In the single-side plugging type structure, the accumulation of the ash may be restrained to discharge the ash from the first cells.

However, in the single-side plugging type structure of the exhaust gas filter, the exhaust gas flow which permeates the partition walls decreases in a case of a high exhaust gas flow velocity and the exhaust gases easily passes through an inside of the cells without exhaust gases being trapped. That is, the exhaust gases in the exhaust gas filter introduced from the upstream side to the downstream side of the exhaust gas flow without being passed through the partition walls. Therefore, appropriately selecting the length of the base material of the exhaust gas filter to restrain performance degradation of trapping the PM has been considered. The base material will be also referred to as a part of the partition walls. There will be a problem that the exhaust gas filter needs to increase in size.

Carrying catalyst on the exhaust gas filter while removing the PM contained in the exhaust gases at the same time can be considered. However, in the single-side plugging type structure, the exhaust gas flow which permeates the partition walls becomes smaller due to pores in the partition walls being coated by catalyst coating layers. There will be a problem that when the decrease of the exhaust gas flow is decreased, an amount of the catalyst coat is restricted. Therefore, desired purifying performance can not be obtained.

SUMMARY

An embodiment provides an exhaust gas filter while being able to improve the purifying performance of harmful substances and trapping performance of PM without the filter being enlarged.

One aspect of this disclosure relates to an exhaust gas filter purifying the exhaust gases including the PM discharged from an internal combustion engine. The exhaust gas filter has a honeycomb structure, plug portions and catalyst. An axial direction of the honeycomb structure is a flow direction of the exhaust gases. Some upstream end faces of the honeycomb structure which face the exhaust gas flow are respectively plugged by the plug portions. The catalyst is supported on the honeycomb structure. The honeycomb structure has a plurality of cells which have partition walls. Pores penetrating between adjacent cells are formed inside the partition walls. The cells include open cells penetrated in the axial direction and plugged cells of which the upstream end faces face the exhaust gas flow and are plugged by plug portions. There is a first region not carrying the catalyst on the partition walls at the upstream side in the exhaust gas flow in the honeycomb structure. There is a second region which carries the catalyst on the partition walls at the downstream side in the exhaust gas flow. The exhaust gas filter has the first and the second regions.

The exhaust gas filter has the open and the plugged cells. Some upstream end faces of the plugged cells which face the exhaust gas flow are respectively plugged by the plug portions. Therefore, a pressure difference is generated by passing the exhaust gases between an adjacent open cell and plugged cell. The open cells has first and second walls which are opposed to each other and the first and the second walls are partition walls. A part of the exhaust gas flowing into the open cell permeates via the first and the second walls and flows into the adjacent plugged cells and open cells due to the pressure difference. Then, the PM is trapped by the pores formed inside the partition walls. The pressure difference generated between the adjacent open cells and plugged cells becomes large at the upstream side of the exhaust gas flow. The pressure difference becomes smaller towards the downstream side of the exhaust gas flow. The exhaust gas filter has the first region which does not carry the catalyst at the upstream side of the exhaust gas flow. Therefore, in the first region, harmful substances included in the exhaust gas can be trapped efficiently using the pressure difference generated between both of the cells and a desired trapping performance can be obtained.

There is the second region which carries the catalyst on the partition walls at the downstream side of the exhaust gas flow. Therefore, in the second region, the harmful substances contained in the exhaust gases may be purified using the catalyst. It is not required to restrict an amount of catalyst coat to allow exhaust gas to permeate through the partition walls in the second region, because the second region does not have sufficient pressure difference to trap the PM. Therefore, the second region has a sufficient amount of the catalyst coat and has raised purifying performance.

Thus, the exhaust gas filter of the above described single-side plugging type structure may be divided into two parts: the first region at the upstream side of the exhaust gas flow and the second region at the downstream side. Therefore, an axial length of a base of material of the exhaust gas filter may be utilized effectively since respective regions have respective functions suitable therefor. As stated above, an above-mentioned embodiment can provide the exhaust gas filter while being able to improve purifying performance against harmful substances and trapping performance to PM. As a result the present disclosure may be miniaturized as compared with a conventional one.

DETAILED DESCRIPTION OF THE PREFERRED EMBODIMENTS

First Embodiment

Figure 1:
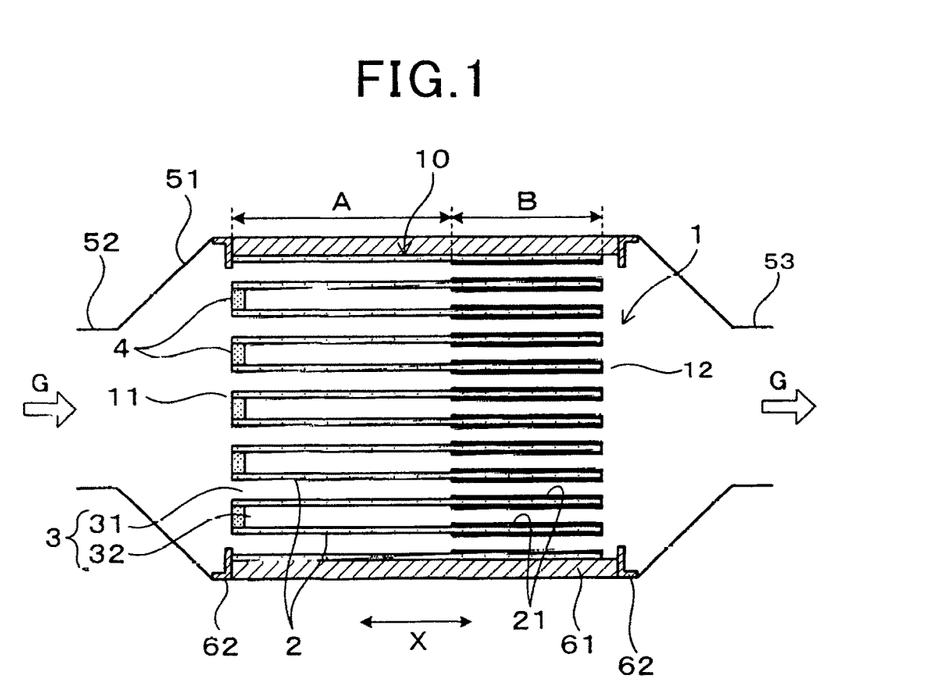
FIG. 1 is an overall schematic cross-section view of an exhaust gas purifying system including an exhaust gas filter according to a first embodiment of the present disclosure.
Figure 2:
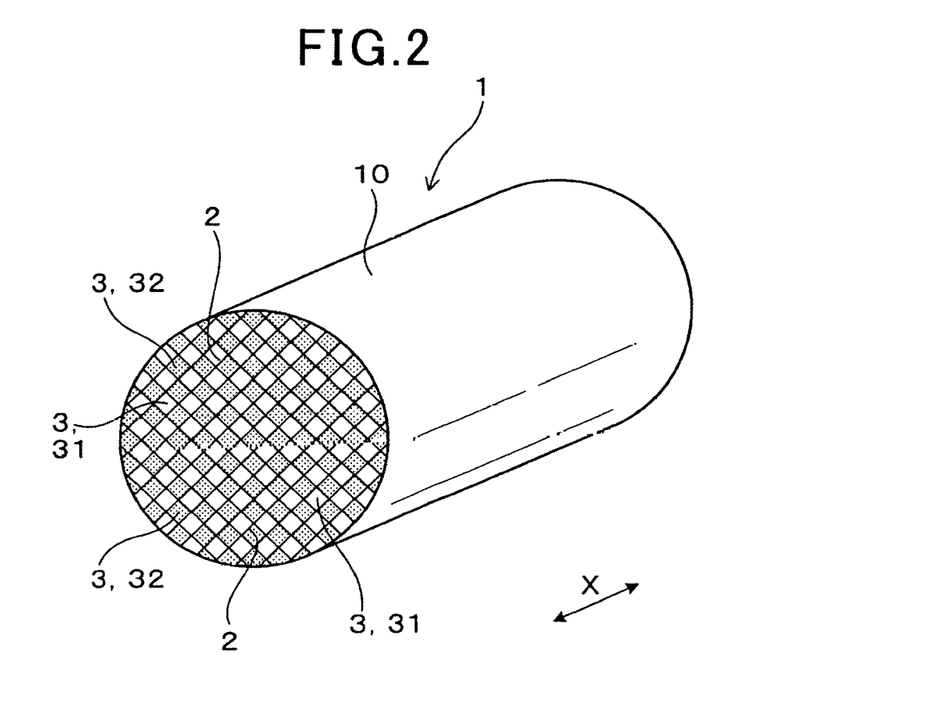
FIG. 2 is a perspective view showing a schematic structure of the exhaust gas filter according to the first embodiment.

Hereafter, a first embodiment of an exhaust gas filter will be described below. The exhaust gas filter 1 of the first embodiment, as illustrated in FIG. 1 and FIG. 2, purifies the exhaust gases and partially carries catalyst. The exhaust gases contain particulate matter (i.e. PM) discharged from an internal combustion engine (not shown). The exhaust gas filter 1 is a single-side plugging type structure, and has a honeycomb structure 10 and a plurality of plug portions 4. An exhaust gas flow G in the honeycomb structure 10 is defined as an axial direction X. A plug portion 4 partially plugs alternate upstream end faces 11 (i.e., left end faces of the honeycomb structure in FIG. 1 or FIG. 2) of the cells which faces the exhaust gas flow G in the honeycomb structure. The honeycomb structure 10 has a plurality of partition walls 2 and cells 3 which have respective partition walls which are open at one axial end and plugged at the another axial end. Pores formed inside the partition walls 2 between adjacent cells 3 which communicate with each other (not shown). The cells 3 have, as illustrated in FIG. 1, open cells 31 which are opened in the axial direction X and plugged cells 32 whose ends facing the upstream side of the exhaust gas flow G are each plugged by the plug portions 4.

The exhaust gas filter 1 may be divided into two parts: a first region A and a second region B in a direction of the exhaust gas flow G. The first region A is a region which does not carry the catalyst on the partition walls 2, and the first region located at the upstream side of the exhaust gas flow G. The second region B is a region which carries the catalyst on the partition walls 2, and the second region B is located at the downstream side of the exhaust gas flow G. The above described partition walls 2 constitute a major part of the open cells 31 and the plugged cells 32. The first region A acts as a trapping range which traps the PM contained in the exhaust gases, and the second region B acts as an purifying range which purifies the harmful substances.

An exhaust gases purifying system is formed in such a way that the exhaust gas filter 1 is, as shown in FIG. 1, disposed in an exhaust pipe of the internal combustion engine (not shown). The exhaust gas purifying system includes a cylindrical case 51 in which the exhaust gas filter 1 is disposed. An exhaust gases inlet 52 and an exhaust gases outlet 53 are disposed respectively on the end parts at the upstream side and the downstream side of the exhaust gas flow in the cylindrical case 51. A cylindrical mat material 61 is mounted between a cylindrical case 51 and the honeycomb structure 10, and stoppers 62 are respectively disposed on both end parts thereof. The internal combustion engine is, for example, a direct-injection type gasoline engine or a diesel engine for cars. The exhaust gas filter 1 purifies the harmful substances, such as NOx, CO and HC, and traps the PM contained in the exhaust gases discharged into the exhaust pipe of the exhaust gases.

The exhaust gas filter 1, as illustrated in FIG. 2, is entirely shaped to a columnar form. The partition walls 2 are disposed lattice-like into an outer skin of the columnar form, and the partition walls 2 divide and form a space in the columnar form into the many cells 3. Some cells 3 which are adjacent with each other in the honeycomb structure 10 are, as illustrated in FIG. 1, alternately plugged by a plug at upstream end faces 11 of the cells which face the exhaust gases inlet 52. Downstream end faces 12 (i.e., right end faces of the honeycomb structure as shown in FIG. 1 and FIG. 2) of the cells face the exhaust gases outlet 53, as can be seen in FIG. 1. None of the downstream ends of the cells 3 is plugged by a plug. Thereby, the open cells 31 and the plugged cells 32 are disposed alternately. For each open cell 31, both ends are open (i.e., the upstream end faces 11 and the downstream end faces 12 of the cells in the honeycomb structure 10). One end of each plugged cell 32 is open at the downstream end face 12 of the cell and the other end of the plugged cell 32 is plugged at the upstream end face 11 of the cell (i.e., left end parts in FIG. 1 and FIG. 2).

In the present embodiment, both the open cells 31 and the plugged cells 32 are formed into substantially the same shapes and inner peripheral shapes thereof may be formed in a regular quadrilateral shape. A shape of the cells may be not only the regular quadrilateral but also a rectangle, a polygon, circle or any arbitrary shape. Both the open cells 31 and the plugged cells 32 may not have the same shapes but may have different shapes mutually. Flow passage cross sectional areas of both the open cells 31 and the plugged cells 32 perpendicular to the axial direction X may have different shapes mutually. In such cases flow passage cross sectional areas of the plugged cells 32 are arranged to be larger than those of open cells 31. The pressure difference generated between an adjacent the open cells 31 and the plugged cell 32 increases, and increase in the trapping ratio of the PM contained in the exhaust gases is possible.

The partition walls 2 in the honeycomb structure 10 are composed of ceramic material with a porous structure. The pores formed inside the partition walls 2 communicates the adjacent cells 3 with each other in the honeycomb structure 10. For example, cordierite, silicon carbide or aluminum titanate is used as a constituent of the ceramic material. The plug portions 4 in the honeycomb structure 10 are formed using the similar ceramic materials. In the honeycomb structure 10, the porosity due to the pores inside the partition walls 2 may be adjusted by pore making materials being added to the ceramic materials. The porosity of the honeycomb structure 10 is, for example, set to a range of 40 to 70 percent.

Figure 3:
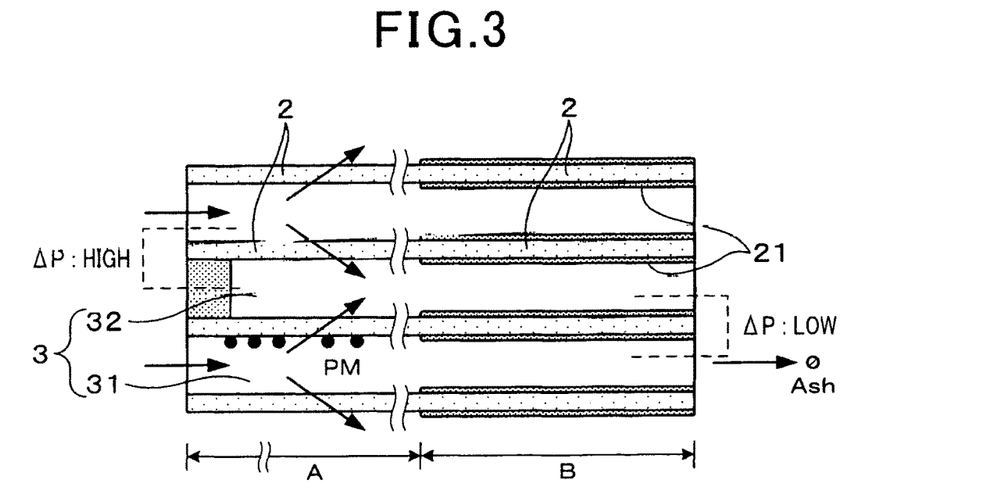
FIG. 3 is an enlarged partial cross-section view of FIG. 1 showing a main structural part of the exhaust gas filter according to the first embodiment.

In the axial direction X of the exhaust gas filter 1, a range in a predetermined length from the upstream end faces 11 of the cells is defined as a first region A. The first region A is used as a trapping range of the PM, and the partition walls 2 forming the open cells 31 and the plugged cells 32 do not carry the catalyst. The pressure difference ΔP, as generated between the adjacent the open cells 31 and the plugged cells 32, becomes large around the upstream end faces 11 of the open cells 31 in which the exhaust gas flow G flows, as illustrated in FIG. 3. Thereby, the exhaust gases may be permeated through the partition walls 2 using the pressure difference ΔP. Each of the open cells composes first and second walls which are opposed to each other, and first and second walls are partition walls 2. The exhaust gases flow from an inflow opening side into the open cells 31, and flow into the adjacent plugged cells 32 via the first and the second wall. In the meanwhile, the PM (i.e., the PM shown in FIG. 3) is separated from the exhaust gases and/or trapped at surfaces and internal pores of the partition walls 2. In this way, the partition walls 2 do not carry the catalyst and the initial porosity is maintained the first region A. Therefore, the exhaust gas flow which permeates the partition walls 2 may have a reduced loss thereof. Therefore, a desired trapping ratio of the PM may be obtained since the PM contained in the exhaust gases may be efficiently trapped in the first region A.

In the exhaust gas filter 1, a volume of the partition walls 2 increases, and the trapping ratio of the PM increases as an axial length of a base of material Lx in the axial direction X of the honeycomb structure is longer. The axial length of the base of material Lx will be referred as a length of a partition wall. The trapping ratio of the PM is increased almost in accordance with an extension of the axial length of the base of material Lx in a range in which the axial length of the base of material Lx is shorter than a standard. However, when the axial length of the base of material Lx become longer than the standard length, an increase of the trapping ratio of the PM with the extension of the axial length of the base of material Lx is gradually moderated. Then, when the axial length of the base of material Lx reaches a limiting length, the trapping ratio of the PM is limited to a limiting ratio. When the axial length of the base of material Lx exceeds the certain length, it is identified that the trapping ratio of the PM does not exceed the prescribed value. This is because it is considered that the trapping ratio of the PM continues to increase in relation with the extension of the axial length of the base of material Lx since a rate permeating the exhaust gases through the partition walls 2 is increased until the axial length of the base of material Lx reaches the certain length. However, when the axial length of the base of material Lx exceeds the certain length, the rate of permeating the exhaust gases through the partition walls 2 is not increased. An entire length of the partition wall is made up of a first and a second section which are aligned with each other in a direction of the exhaust gas flow. The first section is located at the upstream side of the exhaust gas flow and a length thereof is equal to the certain length. The second section is located at the downstream side of the exhaust gas flow. In short, when the axial length of the base of material Lx of the exhaust gas filter 1 exceeds the certain length, the exhaust gases are permeated into the partition walls 2 in the first section. However, the exhaust gases which reach the second section pass through the second section to the downstream side of the exhaust gas flow without permeating the partition walls 2.

In the exhaust gas filter 1, when the axial length of the base of material Lx reaches the certain length, the trapping ratio of the PM is stabilized at the prescribed value and will not change (i.e., a maximum trapping ratio of the PM). In short, the certain length is the shortest length in the axial length of the base of material Lx when the trapping ratio of the PM reaches a maximum. Therefore, an axial direction length LA of the first region A is preferably defined on the basis of the shortest length Ls in the axial length of the base of material. Specifically, the axial direction length LA of the first region A is set at a length that is equal to or more than the shortest length Ls in the axial length of the base of material. Thus, the trapping ratio of the PM of the first region A reaches maximum. An amount of the PM contained in the exhaust gases discharged from the exhaust gas filter 1 is defined as a discharged amount A. An amount of the PM contained in the exhaust gases introduced into the exhaust gas filter 1 is defined as an introduced amount B. The trapping ratio of the PM of the first region A is a ratio of the discharged amount A to the introduced amount B (the ratio is in %).

Alternatively, in a case that the axial length of the base of material Lx of the exhaust gas filter 1 is restricted, a predetermined trapping ratio of the PM which is less than the maximum trapping ratio of the PM is set. Then, the axial direction length LA of the first region A is preferably defined on the basis of the axial length of the base of material at the predetermined trapping ratio of the PM. The predetermined trapping ratio of the PM is, for example, not less than 50% and preferably not less than 90%. The maximum trapping ratio of the PM of the first region A changes in accordance with a cross-sectional area ratio of the open cells 31 and the plugged cells 32, thickness of the partition walls 2, cell density, average pore size and the porosity of the honeycomb structure or the like. Therefore, a relationship between an above described base material specification and the trapping ratio of the PM may be determined in advance and the axial direction length LA of the first region A is preferably set on the basis of this relationship. This allows the axial direction length LA of the first region A to be optimized and a desired trapping ratio of the PM may be reached, thereby preventing enlargement of the exhaust gas filter 1.

In the axial direction X of the exhaust gas filter 1, a range from one of downstream ends of the first region A to a downstream end face 12 of the cells is defined as a second region B. The second region B is used as a purifying range of the PM contained in the exhaust gases, and the partition walls 2 forming the open cells 31 and the plugged cells 32 carry the catalyst. Specifically, in the second region, one of surfaces of the partition walls 2 and one of pore surfaces inside the partition walls 2 are completely covered by one of catalyst-coat layers 21 containing the catalyst. The catalyst is, for example, a noble metal catalyst, such as Pt, Rh and Pd and may be selected in accordance with the exhaust gases to be purified. The catalyst-coat layers 21 are formed by carrying the noble metal catalyst on porous carriers including promoters such as ceria-zirconia complex oxide and alumina or the like. A catalyst-coat layer 21 is coated on a surfaces of the partition walls 2 of the honeycomb structure evenly. For further details, see FIG. 3.

As can be seen in FIG. 3, when the exhaust gas passes through the first region A at the upstream side of the exhaust gases flow in the second region B at the downstream side of the exhaust gas flow, the exhaust gas comes into contact with the catalyst-coat layer 21 inside the open cell 31 or the plugged cell 32. The exhaust gas diffuses in the porous catalyst-coat layers 21, and harmful substances contained in the exhaust gases are purified by the noble metal catalyst. In the first region A, the pressure difference ΔP, as generated between the adjacent the open cell 31 and the plugged cell 32, becomes lower towards the downstream end faces 12 of the cells (which will be also referred to as an outlet of the exhaust gas), as can be seen in FIG. 3. Therefore, as described above, the exhaust gas flow which permeates the partition walls 2 decreases. However, influence on the trapping performances of the PM is small since the desired trapping ratio of the PM may be obtained in the first region A, as described above. The respective downstream end faces 12 of the open cells 31 and the plugged cells 32 are open. Thereby, ash (i.e., the Ash shown in FIG. 3) contained in the exhaust gases is emitted outwardly from openings of the open cells 31 or the plugged cells 32 and does not stay inside the exhaust gas filter 1.

In the second region B, an amount of the catalyst coat forming the catalyst-coat layers 21 may be, for example, 50 to 250 g/L. the amount of the catalyst coat is preferably, for example, not less than 100 g/L. The amount of the catalyst coat is preferably large to raise a purifying performance of the exhaust gases and to restrain a degradation of the purifying performance by repetition of cold and heat. The heat is generated from the exhaust gases emitted from the above described internal combustion engine which is in motion. When the internal combustion engine stops, the temperature changes from high to low. Thereby, the heating and cooling are repeated. The above described amount of the catalyst coat is defined as a molarity of the catalyst-coat layers 21 carried per 1 L of volume of the exhaust gas filter 1. In the exhaust gas filter 1, increasing the amount of the catalyst coat leads normally to a degradation of the trapping performance of the PM. However, in the present embodiment, the desired trapping ratio of the PM may be obtained in the first region A at the upstream side of the exhaust gas flow. Therefore, in the second region B which is the purifying region of the PM, the amount of the catalyst coat may be arbitrarily set so as to obtain the required purifying rate of the PM.

An axial direction length LB of the second region B which is the purifying range of the PM may be arbitrarily set. In the second region B, a catalyst carrying area becomes larger as the length LB of the axial direction becomes longer. The purifying performance of the exhaust gases is improved by increasing the catalyst carrying area. The axial length of the base of material Lx tends to become long by the second region B being disposed to the downstream side of the exhaust gas flow of the first region A in a direction in which the exhaust gas flows. Thereby, for example, a high flow rate of the exhaust gases leads to raising an effect of preventing flow through inside of the cells without trapping the exhaust gases. On the other hand, as the axial length of the base of material Lx of the exhaust gas filter 1 becomes longer, the exhaust gases purifying system needs to increase in size. Therefore, in the second region B, the axial direction length LB and the amount of the catalyst coat in the second region B are preferably adjusted so as to obtain desired purifying performance within a range that the axial length of the base of material Lx of the exhaust gas filter 1 is not exceed the certain length.

In this way, the exhaust gas filter 1 of the present embodiment has the single-side plugging type structure and the first region A and the second region B. The single-side plugged structure is formed such that alternate ends facing the exhaust gas flow G are blocked by a plug. The single-side plugging type structure prevents accumulation of the ash contained in the exhaust gases on the exhaust gas filter 1. The first region A does not carry the catalyst at the upstream side. The second region B carries the catalyst at the downstream side. Therefore, the exhaust gas filter 1 has the trapping performance for the PM and the purifying performance of the exhaust gases together by separating two ranges which have respectively different functions.

Second Embodiment

According to the first embodiment, the exhaust gas filter 1 may be formed in such a way that the catalyst-coat layer 21 in the second region B completely covering the partition wall forming the cells has equal thickness for each cell. However, the exhaust gas filter 1 may also be formed in such a way that the thickness of the catalyst-coat layer 21 in the second region B disposed on the open cells and the plugged cells is different. In the latter situation, the thickness of the catalyst-coat layer 21 inside the open cell 31 is preferably formed more thickly, and an example in the latter situation will be described below.

Figure 4:
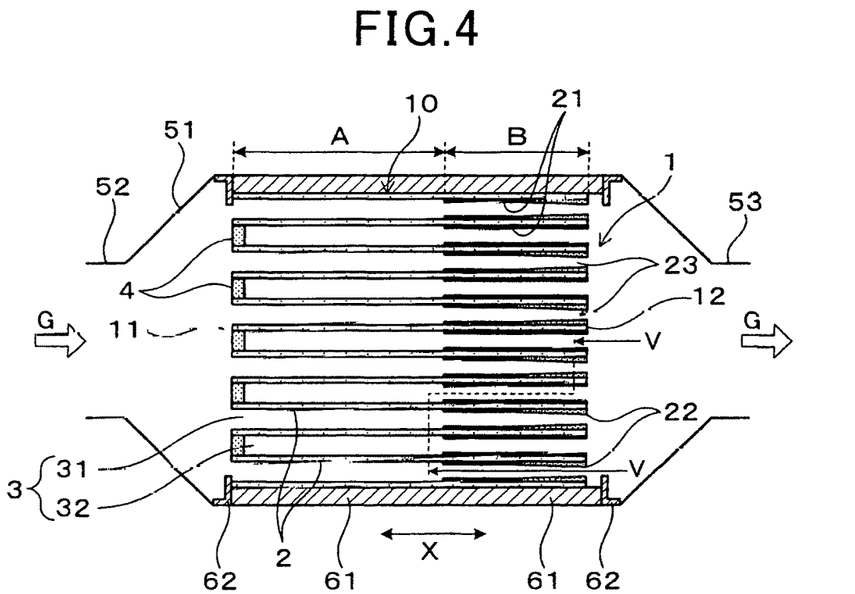
FIG. 4 is an overall schematic cross-section view of an exhaust gases purifying system including exhaust gas filter according to a second embodiment of the present disclosure.
Figure 5:
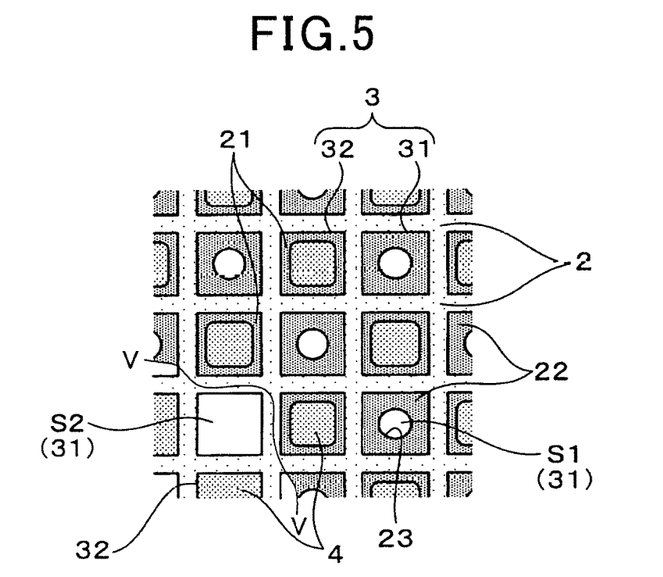
FIG. 5 is an enlarged partial cross-section view of downstream end faces of the exhaust gas filter which are opposed to each other in a direction in which an exhaust gas flows, as taken along the line V-V in FIG. 4 according to the second embodiment.

Upstream ends of the open cells 31 which face the exhaust gas flow are defined as first ends. Downstream ends of the open cells 31 which are opposed to the first ends in a direction of the exhaust gas flow are defined as second ends. In the second region B of an exhaust gas filter 1 of a second embodiment, as illustrated in FIG. 4 and FIG. 5, the thickness of the catalyst-coat layer 21 covering the entire surface of the open cell 31 except for end faces of the open cell 31 in the first end and in the second end are different. The thickness of the catalyst-coat layer 21 completely covering the partition wall 2 on the open cells 31 in the second region B is defined as having a second thickness. Specifically, the thickness of the catalyst-coat layer 21 at at least the second end is formed thicker than at the first end. For example, as illustrated in FIG. 4, tapered portions 22, which are the catalyst-coat layers, are formed in such a way that the second thickness becomes gradually thicker towards the second ends. The thicknesses of the catalyst-coat layer 21 completely covering the partition wall 2 on the plugged cells 32 in the second region B is substantially constant. In the downstream end faces 12 of the cells of the exhaust gas filter 1, cell openings of open cells 31 are smaller than those of plugged cells 32. Instead of the tapered portions 22, stepped portions, which are the catalyst-coat layers 21, formed in such a way that the second thickness becomes thicker in a stepped pattern towards the second ends may be used. The catalyst-coat layer 21 may be a tapered or stepped shape not only over the entire the second end but also over the entire second region B in the open cell 31. Incidentally, the exhaust gas filter 1 of the second embodiment has an substantially the same structure as that of the first embodiment except for the catalyst-coat layers 21, and therefore detail thereof is omitted.

Figure 6:
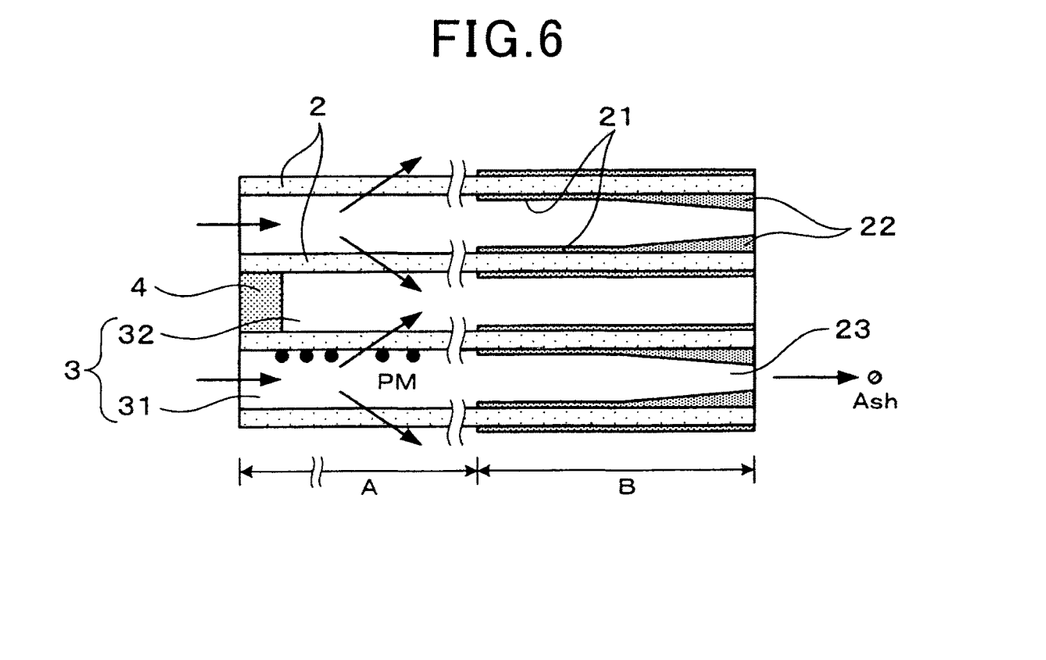
FIG. 6 is an enlarged partial cross-section view of FIG. 4 showing a main structural part of the exhaust gas filter according to the second embodiment.

In the second region B, when the tapered portions 22 are extending inside the open cells 31, the second thickness becomes thicker gradually towards the second ends as described above. As can be seen in FIG. 5, any one of the opening areas S1 of the open cell 31 is smaller than the opening areas S2 (i.e., S1<S2). The opening area S1 is a space in which one of openings at the second ends is partially blocked by the catalyst. An opening area S2 of the open cell 31 is substantially a space of one of the upstream end faces 12. In the downstream end faces 12, one of openings 23 which is formed as surrounded by the tapered portions 22 is substantially circular in shape. A pressure inside the open cell 31 is increased by extending one of the tapered portion 22 inside the open cell 31 in the second region B. Thereby, the pressure difference ΔP generated between adjacent open cells 31 and plugged cells 32 becomes larger. Thus, in the first region A, as can be seen in FIG. 6, the exhaust gas flow permeating the partition walls 2 is increased and the trapping ratio of the PM contained in the exhaust gases is increased further.

In the second region B, the catalyst-coat layers 21 formed on the respective surfaces of the open cells 31 and the plugged cells 32 purify the harmful substances contained in the exhaust gases. Since the open cells 31 have the tapered portions 22 at the second ends, the exhaust gases introduced into the open cells 31 flow along the tapered portions 22 and/or are easily diffused inside the tapered portions 22. Thereby, the opportunity for contact with the catalyst increases and the trapping ratio of the harmful substances contained in the exhaust gases is increased further. Since the respective downstream end faces 12 of the open cells 31 and the plugged cells 32 are open, the ash contained in the exhaust gases (i.e., the Ash in FIG. 6) is easily discharged outside the honeycomb structure 10.

The pressure inside the open cells 31 becomes larger as the opening areas S1 of the open cells 31 at the second ends become smaller. Then, the pressure difference ΔP generated between the adjacent the open cell 31 and the plugged cells 32 becomes large. An opening ratio (unit: %) represented by the formula described below may be preferably, for example, less than 80% to obtain an increasing effect for the trapping ratio of the PM contained in the exhaust gases using the above described pressure difference ΔP.

$$\text{Opening ratio} = (S1/S2) \times 100 \quad \text{(Formula)}$$

The opening ratio is a ratio of the opening area S1 located at the second end to the opening area S2 located at the first end.

When the opening areas S1 become small, the ash contained in the exhaust gases stays and is easily piled up inside the open cell 31. Therefore, in the second end, the opening 23 which is surrounded by the tapered portion 22 may be plugged by ash accumulated inside the open cells 31. For this reason, the opening 23 is preferably formed sufficiently larger than a particle size of the ash contained in the exhaust gases. For example, the catalyst-coat layer 21 is preferably formed in such a way that an opening area of the second end (i.e., a diameter of the opening 23) is not less than 0.2 mm. This is because the particle size of the ash usually has a size of about 1 to 100 μm, and 200 μm (i.e., 0.2 mm) at a maximum.

According to the present embodiment, the catalyst-coat layer 21 inside the open cell 31 is formed thickly at some of the second ends. The opening area S1 located at the second end becomes small due to the catalyst-coat layers 21 blocking it. Thereby, the trapping performance which traps the PM in the first region A and the purifying performance which purifies the harmful substances in the second region B may be further improved. Since the catalyst-coat layers 21 inside the open cells 31 have the tapered portions 22 at the second ends, the amount of the catalyst-coat layers 21 and the opening area of the second end may be arbitrarily changed by changing the shape of the tapered portions 22. The pressure difference ΔP between the adjacent cells 3 is increased and a deposition of the ash is restrained at the same time by adjusting the amount of the catalyst-coat layers 21 and the opening area of the second end. Thus, the exhaust gas filter 1 has a compact structure for purifying the exhaust gases effectively.

First Example

The above described exhaust gas filter 1 is formed in the following way. The exhaust gas filter 1 is formed in such a way that some of the upstream ends of the columnar honeycomb structure 10 which face the exhaust gas flow are respectively plugged by the plug portion 4. The honeycomb structure 10 is made of cordierite and has a size of φ132 mm×L 100 mm. The honeycomb structure 10 has a large number of the cells 3 whose inner peripheral shape is a square shape, a density of the cells 3 is 300 inch², the thickness of the partition walls 2 is 0.28 mm, the average pore size inside the partition walls 2 is 18 μm and the porosity of pores formed inside partition walls 2 is 60%.

First, kaolin, talc, fused silica and alumina are used as cordierite raw material. Respective material powders are combined in such a way that MgO, Al2O3, and SiO2 are in a molar ratio of substantially of 2, 2 and 5 as cordierite composition. The combined material powders are crushed and mixed by a wet process and carbon as pore forming material is added thereto. Next, a mixture which is thickened by adding methylcellulose as thickener is kneaded and a ceramic body is obtained. After the ceramic body formed by extrusion molding using a mold is cut into a prescribed size, a dried body is obtained by drying the ceramic body. The dried body is calcinated at 1400 to 1440 degrees centigrade and the honeycomb structure 10 which is made of the cordierite is obtained. After that, the upstream openings of the cells 3 in the honeycomb structure 10 which face the exhaust gas flow are plugged by ceramic material in alternately a reticular pattern. The single-side plugging type structure of the honeycomb structure 10 is obtained by calcinating at no less than 500 degrees centigrade.

The exhaust gas filter 1 is configured by forming the catalyst-coat layers 21 which carry catalyst in the honeycomb structure 10. Pt and Rh are used as a noble metal catalyst which is a material for the catalyst-coat layers 21. A downstream end face of the honeycomb structure 10 which faces the exhaust gases outlet 53 is immersed in a catalyst slurry. The catalyst slurry is viscosity-adjusted by using Zirconia/ceria-based composite oxide and γ-alumina as a carrier, and the noble metals are mixed therein. After the downstream end face of the honeycomb structure to which the catalyst-coat is attached is dried, the catalyst-coat layers 21 are formed by calcinating the dried catalyst-coat. Thereby, the exhaust gas filter 1 which has the first region A and the second region B is obtained. The first region A which does not carry the catalyst is disposed nearer an end face plugged by the plug portion 4. The second region B in which the catalyst-coat layers 21 are formed is disposed nearer an end face which does not have the plug portion 4.

Figure 7:
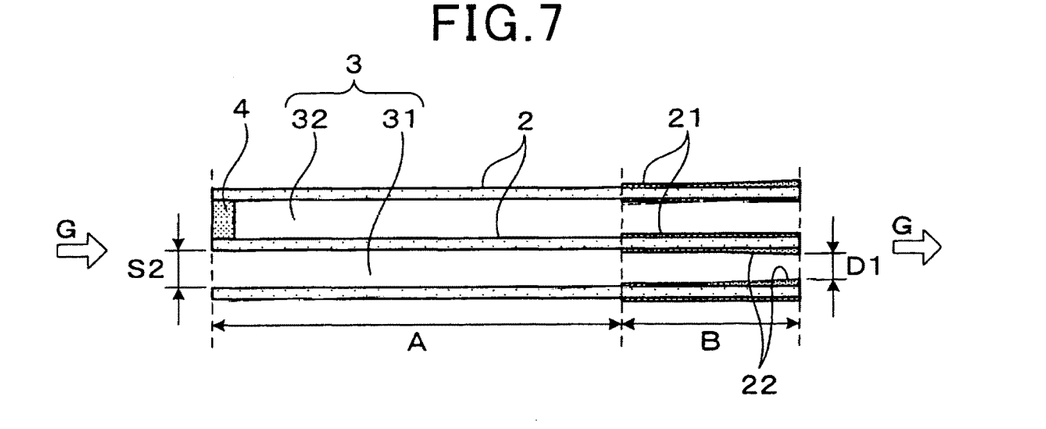
FIG. 7 is an enlarged partial cross-section view showing a plurality of cells of an exhaust gas filter according to the first embodiment.

In addition, one of opening ends of the second region B in the obtained open cells 31 of the exhaust gas filter 1 is impregnated with the above described viscosity-adjusted catalyst slurry which has low viscosity. Impregnation time is set to be 1 to 2 seconds. Tapers of the catalyst-coat layers 21 of open cells 31 are emphasized by invading the catalyst slurry selectively into the open cells 31. After impregnation, as can be seen in FIG. 7, the tapered portions 22 are disposed nearer the downstream ends of the open cells 31 of the catalyst-coat layers 21. Then, an opening ratio of the open cell 31 (i.e., The opening ratio is a ratio of the opening area S1 located at the second end to the opening area S2 located at some of the first ends; S1/S2) is set to 80%.

In the plugged cells 32, the axial length of the base of material Lx of the exhaust gas filter 1 is 100 mm. A portion of the plugged cell 32 extending from one of upstream ends of the plugged cells 32 which faces the exhaust gas flow to a predetermined length in a direction of the exhaust gas flow is plugged by the plug portions 4.

Figure 8:
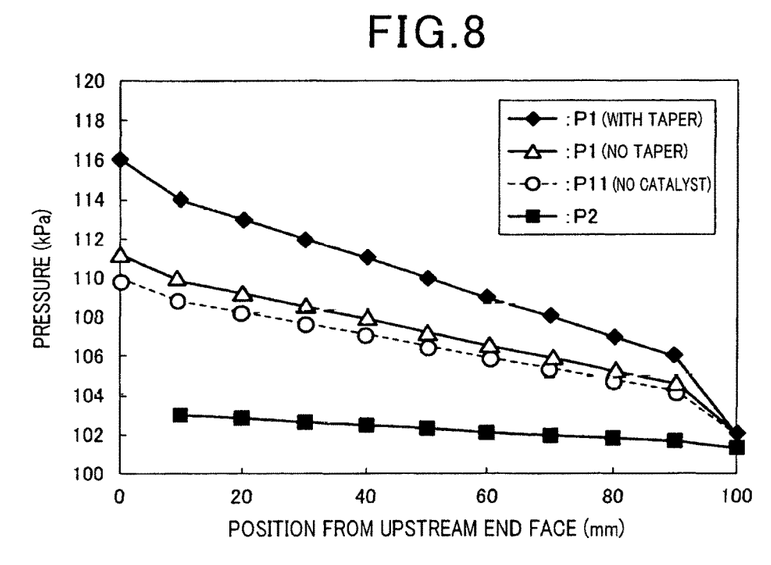
FIG. 8 is a pattern graph showing relations between a distance from one of upstream end faces of the exhaust gas filter which faces an exhaust gas flow and a pressure in open and plugged cells when model gases from an upstream side of the exhaust gases flow into the exhaust gas filter according to the first example.
Figure 9:
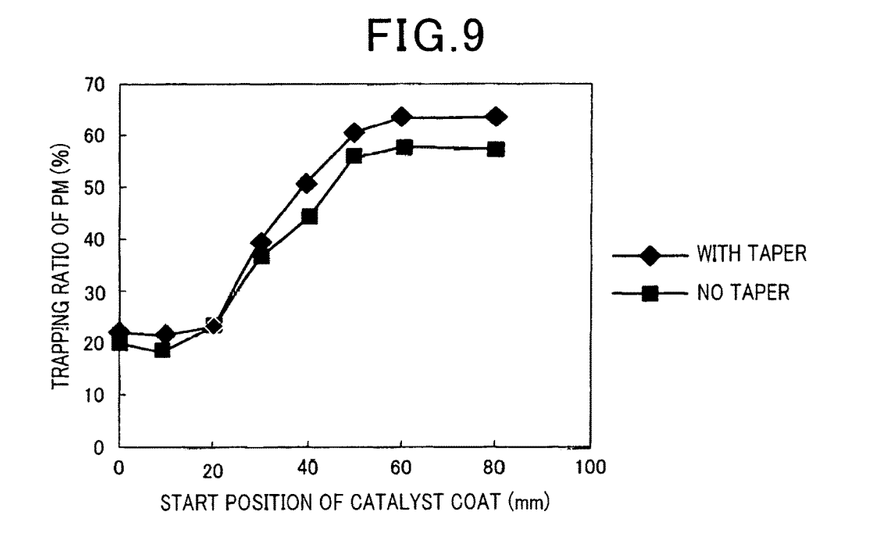
FIG. 9 is a pattern graph showing relations between the distance from one of upstream end faces of the cells of the exhaust gas filter to a start position of catalyst coat in a direction of exhaust gas flow and a trapping ratio of PM when model gases from the upstream side of the exhaust gases flow into the exhaust gas filter according to the first example.

FIG. 8 shows a pressure distribution of the open cells 31 and the plugged cells 32 in the exhaust gas filter 1 having the tapered portions 22 obtained by the above described method. The pressure distribution is obtained at the time that model gases from the upstream side of the exhaust gas flow into the exhaust gas filter. FIG. 9 shows relations between the distance from the upstream end face of the cell in a direction of exhaust gas flow to a start position of the second region B (hereinafter referred to as "the length of non-catalyst region") and the trapping ratio of the PM (i.e., the trapping ratio of the PM shown in FIG. 9). The second region B has the catalyst-coat layers 21 formed by the above described method and the start position of the second region B is a boundary position between the first region A and the second region B. The trapping ratio of the PM illustrated in FIG. 9 in accordance with a change of the boundary position is shown. In the case of calculating the trapping ratio of the PM, a V type six-cylinder direct injection type gasoline engine (hereinafter referred to as "V type gasoline engine") is operated under the following conditions. In the V type gasoline engine, rotation speed: 2000 rpm, gas flow rate: 25 g/sec, fuel injection timing: 330° BTDC and filter floor temperature: 400 degrees centigrade. Amounts of the PM contained in the model gases before introducing into and after discharging from the exhaust gas filter 1 are calculated by an Engine Exhaust Particle Sizer (EEPS) spectrometer model 3090 produced by Tokyo Dylec Co. Ltd. The trapping ratio of the PM is calculated by a difference between the amounts of the PM contained in the model gases before introducing into and after discharging from the exhaust gas filter 1.

A pressure P1 inside the open cells 31 is, as can be seen in FIG. 8, the highest at the upstream ends of the open cells 31. The pressure P1 becomes lower towards the downstream ends of the open cells 31. The pressure P1 at the downstream end of the open cell 31 is substantially the same pressure P2 as inside the plugged cell 32. The pressure difference ΔP, as generated between adjacent open cells 31 and plugged cells 32 is high at the upstream side of the exhaust gas flow. ΔP becomes lower towards the downstream side of the exhaust gas flow and has greatly dropped at the downstream ends of the cells. The pressure P1 inside the open cells 31 having the taper portion 22 (i.e., with taper) indicates a similar tendency with respect to the pressure P1 inside the open cells 31 not having the taper portion 22 (i.e., no taper). The pressure P1 inside the open cells 31 which carry the catalyst (i.e., no taper) shown in the figure as a reference, is higher than a pressure P11 inside the open cells 31 not having the catalyst (i.e., no catalyst). This tendency applies to any length of non-catalyst region. On the other hand, when the length of non-catalyst region is, as shown in FIG. 9, 0 to about 20 mm (i.e., 0 to about 20% of the axial length of the base of material Lx), the trapping ratio of the PM stays at substantially 20%. When the length of non-catalyst region is above 20 mm, the trapping ratio of the PM is increased suddenly. The trapping ratio of the PM of each of the open cells 31 having the taper portion 22 is higher than those not having the taper portions 22 for any length of non-catalyst region. The open cells 31 having the taper portions 22 and not having the taper portions 22 are hereinafter referred to as "cells with taper" and "cells without taper" respectively.

When the length of the non-catalyst region is 0 to about 30 mm (i.e., 0 to about 30% of the axial length of the base of material Lx), the trapping ratio of the PM of one of the cells with taper and the cell without taper are about 20 to 40% respectively and are slightly different. When the length of the non-catalyst region is not less than 40 mm (i.e., 40% of the axial length of the base of material Lx), the trapping ratio of the PM of the cell with taper and the cell without taper have a major difference. For example, the trapping ratio of the PM of the cell with taper is above 50% when the length of the non-catalyst region is 40 mm. The trapping ratio of the PM of the cell with taper is above 60% when the length of the non-catalyst region is 50 to 60 mm (i.e., 50 to 80% of the axial length of the base of material Lx). The trapping ratio of the PM of the cell with taper is substantially the same when the length of the non-catalyst region is not less than 60 mm. The trapping ratio of the PM of one of the cells without taper is 55% or more and less than 60% when the length of the non-catalyst region is 50 to 60 mm. The trapping ratio of the PM of the cell without taper is substantially the same when the length of the non-catalyst region is not less than 60 mm.

Thus, the above described first region A is preferably set in the exhaust gas filter 1 so as to obtain the desired trapping ratio of the PM using the pressure difference ΔP at the upstream side of the exhaust gas flow. Preferably, the axial direction length LA of the first region A is not less than 50% of the axial length of the base of material Lx which has a nearly constant trapping ratio of PM. More preferably, the axial direction length LA of the first region A is not less than 60% of the axial length of the base of material Lx, at which the trapping ratio of the PM becomes maximum and constant. Thereby, the pressure difference ΔP between adjacent open cells 31 and plugged cells 32 can be used effectively to trap the PM.

Example 1

Figure 10:
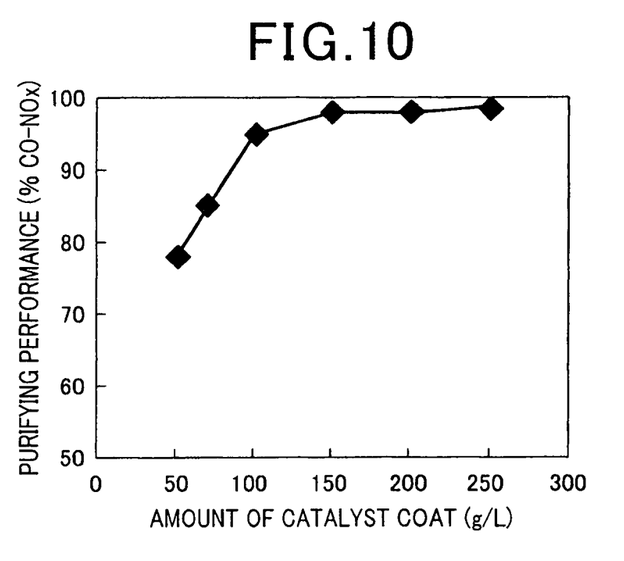
FIG. 10 is a pattern graph showing relations between an amount of the catalyst coat carried on a plurality of partition walls of the exhaust gas filter and a purifying rate of harmful substances contained in the exhaust gases according to the first example.

In the exhaust gas filter 1 obtained by the above described method, the purifying performance of the PM contained in the exhaust gases in accordance with a change of the amount of the catalyst coat in the second region B is assessed. The result is shown in FIG. 10. In FIG. 10, the catalyst-coat layers 21 do not have the taper portions 22, and an amount of the noble metal catalyst and the carrier are described below. The axial direction length LA of the first region A is 60 mm and the axial direction length LB of the second region B is 40 mm.

The amount of the noble metal catalyst Pt:Rh=0.6 g/L: 0.15 g/L; fixed

The amount of the carrier Zirconia/ceria-based composite oxide 40%, γ-alumina 60%:50 to 250 g/L The honeycomb structure 10: 0.9 L, 3 mil/600 cell The purifying performance of the PM is evaluated by a purifying ratio of the PM at an air fuel ratio where a purifying ratio curve of CO and NOx contained in the exhaust gases intersect. When the purifying performance of the PM is evaluated, the exhaust gas is introduced into the exhaust gas filter 1 under a durability condition described below using a 2.4 L four-cylinder direct injection type gasoline engine. An evaluating condition of the purifying ratio of the PM is as follows.

The durability condition:rotation speed:3800 rpm, gas flow rate:18 g/sec, 950-degrees centigrade rich-lean durability test The evaluating condition:rotation speed:2200 rpm, gas flow rate:10.2 g/sec, temperature of exhaust gas before being introduced into the exhaust gas filter 1: 500-degrees centigrade.

As shown in FIG. 10, the purifying ratio of the harmful substances is increased suddenly to about 80% to 95% when the amount of the catalyst-coat is 50 to 100 g/L. The purifying ratio of the harmful substances is stable at a ratio slightly lower than 100% when the amount of the catalyst-coat is above 150 g/L. Therefore, the purifying ratio of the PM may be near the maximum ratio by setting the amount of the catalyst-coat in the second region B preferably at not less than 100 g/L. In a case that the catalyst-coat layers 21 have the taper portions 22, one of opening areas of the above described second end may be adjusted by increasing the amount of the catalyst-coat. Then, the taper portions 22 have the desired shape.

Example 2

Figure 11:
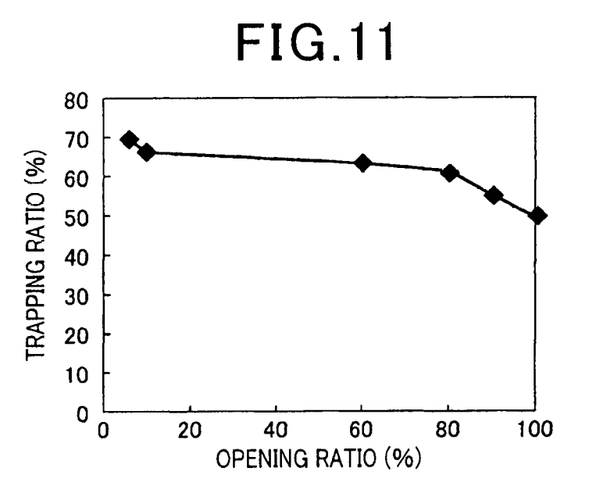
FIG. 11 is a pattern graph showing relations between an opening ratio of the one of upstream end faces of the open cells which faces the exhaust gas flow to downstream one of end faces of the exhaust gas filter which are opposed to each other in a direction in which an exhaust gas flows and the trapping ratio of the PM contained in the exhaust gases according to the first example.

In the exhaust gas filter 1 obtained by the above described method, the trapping ratio of the PM in accordance with a change of the opening ratio S1/S2 of the open cells 31 is assessed. This result is shown in FIG. 11. The opening ratio S1/S2 is changed by changing the amount of the catalyst-coat in the second region B. Specifically, the opening area S1 at the second end is changed in a range of 5 to 100% of an opening area S2 at the above described first end. The axial direction length LA of the first region A is 60 mm at which the trapping ratio of the PM becomes maximum for the length of the base material being 100 mm.

As shown in FIG. 11, the trapping ratio of the PM becomes larger from 50% as the opening ratio S1/S2 is smaller than 100%. When the opening ratio S1/S2 is 80%, the trapping ratio of the PM is above 60%. When the opening ratio S1/S2 is not more than 80%, the trapping ratio of the PM is increased modestly. When the opening ratio S1/S2 is 10%, the trapping ratio of the PM is about 65%. When the opening ratio of the PM is 5%, the trapping ratio of the PM is a ratio slightly lower than 70%. Thus, in a case that the second region B has the taper portions 22, the opening ratio S1/S2 is preferably not more than 80%. Thereby, the PM may be trapped effectively.

Figure 12:
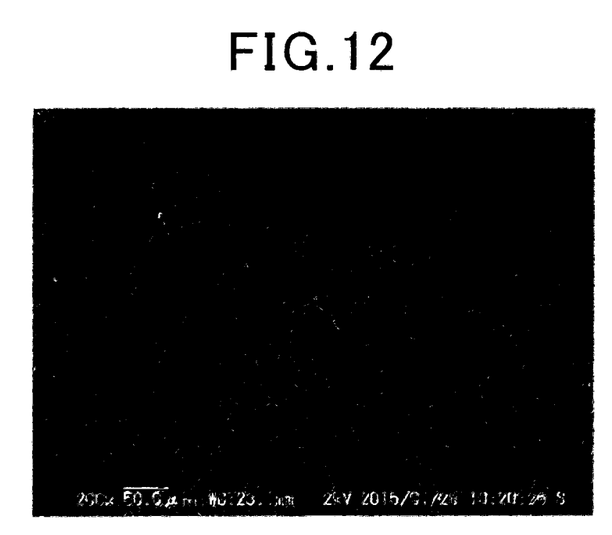
FIG. 12 is an electron micrograph showing an appearance of ash separated from the cells of the exhaust gas filter according to the first example.
Figure 13:
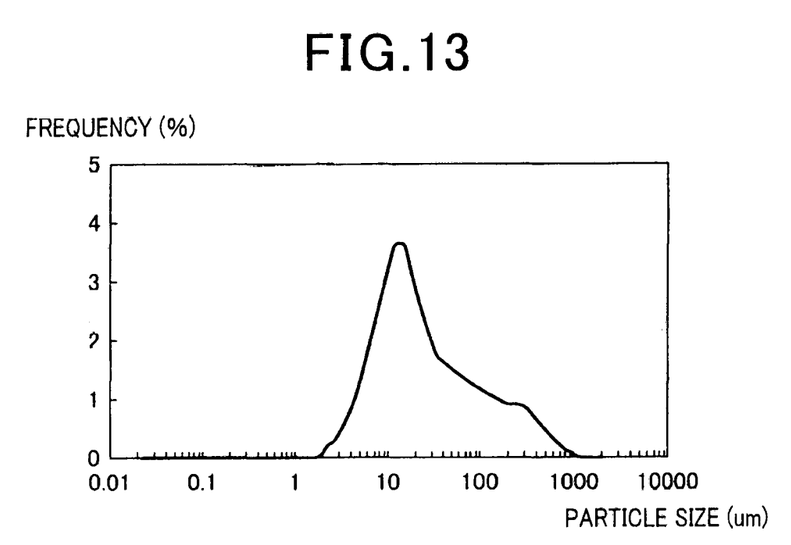
FIG. 13 is a particle size distribution of the ash separated from the cells of the exhaust gas filter according to the first example.

However, when the opening ratio S1/S2 becomes small to some extent, it is found that the ash contained in the exhaust gases is easily collected inside the cells 3. As can be seen in FIG. 12, a result of measuring a particle size distribution of the ash is shown in FIG. 13 on the basis of a SEM image of the ash separated from the cells 3. As shown in FIG. 13, a particle size of ash has a distribution between one and 1000 μm and a sharp main peak is indicated at the particle size of about 10 μm. On the basis of the particle size distribution of the ash, after calculating a particle size whose volume accumulation of the ash is 90% (i.e., D90), a particle size D90 is found to be 192 μm. This result enables not less than 90% of the ash to be discharged regardless of the opening ratio S1/S2 if a cell opening size D1 at the second end is, for example, 200 μm (i.e., 0.2 mm).

Then, in some of the open cells 31 of the exhaust gas filter 1, presence or absence of clogging of an opening at the second end by accumulating ash after the durability test is checked. When the durability test is checked, the cell opening size D1 is changed in a range of 0.05 to 0.5 mm. The above described V type gasoline engine is used in the durability test and is operated for 30 hours in a cycle of cutting fuel every 2 minutes under the following conditions. After the durability test, the open cells 31 are observed and presence or absence of clogging of the opening at the second end is assessed under the following conditions and this result is shown in Table 1. This assessment is performed on the basis of a cell blockage ratio of the accumulation of the ash after the durability test, compared to an opening area S1 before the durability test.

A durability condition:rotation speed:3200 rpm, gas flow rate:15 g/sec, fuel injection timing:330 degrees centigrade BTDC Fuel:gasoline with 1% engine oil component added.

An assessment condition: a case of the cell blockage ratio being not less than 20% is determined to be blocked, a case of the cell blockage ratio being under 20% is determined not to be blocked.

TABLE 1

| | Cell opening size (mm) | | | | | |
|---|---|---|---|---|---|---|
| | 0.05 | 0.1 | 0.2 | 0.3 | 0.4 | 0.5 |
| Blockage | Y | Y | N | N | N | N |

"Y" means "Blockage is present".
"N" means "Blockage is not present".

As clearly shown in Table 1, when the cell opening size D1 at the second end is under 0.2 mm, the cell blockage ratio by accumulating of the ash is not less than 20%. However, when the cell opening size D1 is not less than 0.2 mm, the ash is suppressed from accumulating inside the open cell 31 and the cell blockage ratio may be decreased.

Comparative Example 1

To compare the exhaust gas filter 1 described in the first example, a comparative exhaust gas filter is manufactured. The comparative exhaust gas filter is substantially the same as the exhaust gas filter 1 manufactured to have a region which has catalyst adhered. In the comparative exhaust gas filter, a region with upstream ends facing the inlet is disposed, equivalent to the first region A which carries catalyst. The catalyst is same as the catalyst-coat layers 21 and has an aluminum carrier which contains noble metal catalyst and ceria-zirconia complex oxide.

In the comparative exhaust gas filter the region in which one of the upstream ends is disposed is defined as a region A. In the comparative exhaust gas filter, a region in which the downstream ends face the outlet is disposed equivalent to the second region B and is also defined as a region B. An amount of the catalyst in the region A is not less than 20 g/L, and an amount of the catalyst in the region B is not less than 160 g/L. In the comparative exhaust gas filter, a catalyst slurry is adjusted in such a way that solated ceria-zirconia complex oxide and 10% alumina sol are mixed. Next, the catalyst slurry with the predetermined noble metal catalyst is added to a substrate of the comparative exhaust gas filter. Then, an extra portion of the added catalyst slurry is sucked by an air blower device so as to suppress blockage of pores inside partition walls and catalyst coats are formed in the comparative exhaust gas filter. An axial length of a base of material of the comparative exhaust gas filter has lengths of the regions A and B in an axial direction. The axial direction length of the region A is 60 mm and of the region B is 40 mm for 100 mm axial length of the base of material of the comparative exhaust gas filter.

In the comparative exhaust gas filter obtained by the above method, a calculated purifying ratio of PM including in the exhaust gases is substantially the same as the exhaust gas filter 1 described in example 1. The first region A of the exhaust gas filter 1 does not carry the catalyst. In the comparative exhaust gas filter, the catalyst slurry needs to have low viscosity by solating so as not to close pores inside the region A. Since this is the case, control of the process of a catalyst coat requires labor. From this result, like this present disclosure, only the second region B carries the catalyst. Thereby, adjusting the catalyst slurry and the process of the catalyst coat are simplified and the exhaust gases is purified effectively.

What is claimed is:

1. An exhaust gas filter which purifies exhaust gases including particulate matter discharged from an internal combustion engine comprising:
a honeycomb structure whose axial direction is a flow direction of the exhaust gases;
a plug portion which partially plugs an upstream end face of the honeycomb structure which faces the exhaust gas flow; and
a catalyst carried in the honeycomb structure, wherein:
the honeycomb structure has a plurality of partition walls, cells surrounded by the partition walls, with a first region not carrying the catalyst being disposed on the partition walls at an upstream side of the exhaust gas flow and a second region carrying the catalyst on the partition walls at a downstream side of the exhaust gas flow,
the partition walls have pores communicating between adjacent cells,
the plurality of the cells comprise open cells having a first end face open in the axial direction and plugged cells whose upstream end faces face the exhaust gas flow and are plugged by the plug portion,
catalyst-coat layers including the catalyst are disposed on the partition walls in the second region and a concentration thereof is not less than 100 g/L, and
a catalyst-coat layer in the open cells has a first end and a second end which are opposed to each other in a direction in which the exhaust gas flows, a thickness of the first end which faces the exhaust gas flow being thinner than the second end.

2. The exhaust gas filter as set forth in claim 1, wherein an axial direction length of the first region is set to the shortest length at which a maximum trapping ratio of the particular matter is reached.

3. The exhaust gas filter as set forth in claim 1, wherein the open cells have a first end and a second end that are opposed to each other in a direction in which the exhaust gas flows, and an opening ratio S1/S2 being a ratio of an opening area of the first end face S1 and the second end face S2 is not more than 80%.

4. The exhaust gas filter as set forth in claim 1, wherein an opening size of the first end face of each of the open cells is not less than 0.2 mm.

5. An exhaust gas filter which purifies exhaust gases including particulate matter discharged from an internal combustion engine comprising:
a honeycomb structure whose axial direction is a flow direction of the exhaust gases;
a plug portion which partially plugs an upstream end face of the honeycomb structure which faces the exhaust gas flow; and
a catalyst carried in the honeycomb structure, wherein:
the honeycomb structure has a plurality of partition walls, cells surrounded by the partition walls, with a first region not carrying the catalyst being disposed on the partition walls at an upstream side of the exhaust gas flow and a second region carrying the catalyst on the partition walls at a downstream side of the exhaust gas flow, the partition walls have pores communicating between adjacent cells,
the plurality of the cells comprise open cells open in the axial direction and plugged cells whose upstream end faces face the exhaust gas flow and are plugged by the plug portion,
catalyst-coat layers including the catalyst are disposed on the partition walls in the second region and a concentration thereof is not less than 100 g/L, and
the open cells have a first end face and a second end face that are opposed to each other in a direction in which the exhaust gas flows, and an opening ratio S1/S2 being a ratio of an opening area of the first end face S1 and the second end face S2 is not more than 80%.

6. An exhaust gas filter which purifies exhaust gases including particulate matter discharged from an internal combustion engine comprising:
- a honeycomb structure whose axial direction is a flow direction of the exhaust gases;
- a plug portion which partially plugs an upstream end face of the honeycomb structure which faces the exhaust gas flow; and
- a catalyst carried in the honeycomb structure, wherein:
- the honeycomb structure has a plurality of partition walls, cells surrounded by the partition walls, with a first region not carrying the catalyst being disposed on the partition walls at an upstream side of the exhaust gas flow and a second region carrying the catalyst on the partition walls at a downstream side of the exhaust gas flow,
- the partition walls have pores communicating between adjacent cells,
- the plurality of the cells comprise open cells having a first end face open in the axial direction and plugged cells whose upstream end faces face the exhaust gas flow and are plugged by the plug portion,
- catalyst-coat layers including the catalyst are disposed on the partition walls in the second region and a concentration thereof is not less than 100 g/L, and
- an opening size of the first end face of each of the open cells is not less than 0.2 mm.

* * * * *